United States Patent Office 3,763,192
Patented Oct. 2, 1973

3,763,192
ANTHRAQUINONE DYESTUFFS
Louis Antoine Cabut, Nogent-sur-Oise, France, assignor to Ugine Kuhlmann, Paris, France
No Drawing. Filed Jan. 13, 1971, Ser. No. 106,232
Claims priority, application France, Jan. 29, 1970, 7003083
Int. Cl. C09b 1/52
U.S. Cl. 260—373       3 Claims

ABSTRACT OF THE DISCLOSURE

Dyestuffs of the formula:

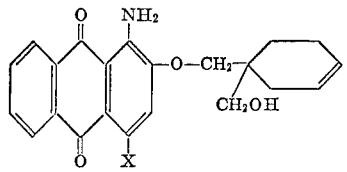

in which X represents a hydroxy, amino or —NH—SO$_2$R group and R represents an alkyl or aryl radical either unsubstituted or substituted by at least one alkyl radical which may contain up to 4 carbon atoms, mixtures of these dyestuffs, processes for their preparation and synthetic or artificial fibres dyed or printed therewith.

---

The invention concerns new anthraquinone dyestuffs.

According to this invention anthraquinone dyestuffs are provided of the general formula:

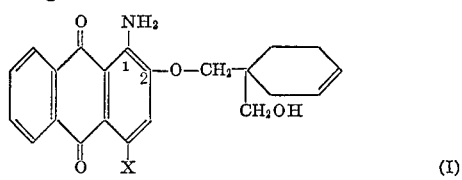

in which X represents a hydroxy, amino or —NH—SO$_2$R group and R is an alkyl or aryl radical either unsubstituted or substituted by at least one alkyl which may contain up to 4 carbon atoms.

Anthraquinone compounds of similar constitution having benzyloxy, cyclohexyloxy, 4'- or 2'-hydroxymethyl cyclohexanemethoxy, or 4'-hydroxymethyl - phenylmethoxy groups in the 2 position are already known. By comparison with these known compounds the compounds of the present invention possess superior tinctorial properties which were entirely unexpected which are characterized both by an excellent resistance to sublimation and a remarkable affinity for fibres based on polyesters.

The dyestuffs of Formula I may be prepared, for example, by the action of 3-cyclohexene-1,1-dimethanol on an acid falling within the general formula:

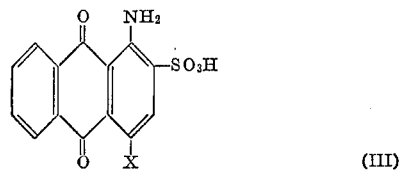

or on the salts of this acid, X having the same significance as in Formula I.

In the case where X in Formula I is hydroxy or amino the dyestuffs may be prepared, for example, by:

(a) The action of 3-cyclohexene-1,1-dimethanol on compounds of the general formula:

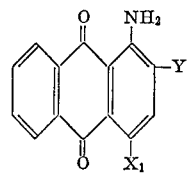

in which X$_1$ represents a hydroxy or amino group and Y represents a phenoxy or an alkoxy group containing up to 4 carbon atoms, or by (b) The action of 3-cyclohexene-1,1-dimethanol on 1-amino-2-bromo-4-hydroxy-anthraquinone or 1,4-diamino-2-chloro-anthraquinone.

The dyestuffs of Formula I used in the dispersed state either singly or in mixtures are well fitted for the colouration of synthetic or artificial fibres, more particularly fibres based on polyesters, for example, those based on polyterephthalates of ethylene glycol. Such fibres are known on the market, for example, by the trademarks "Terylene," "Dacron" or "Tergal."

The dyestuffs according to the invention may be used according to the usual methods of dyeing or printing. They can be applied, for example, by means of dyebaths containing a dispersion of the dyestuff and advantageously a swelling agent at temperatures around 100° C. or at temperatures above 100° C. in closed apparatus. Pure and full-bodied shades are obtained which range from pink to red-violet and which are characterised by very good fastness to light and excellent fastness to sublimation.

The invention is illustrated by the following examples, in which the parts and the percentages are by weight.

EXAMPLE 1

60 parts of 3-cyclohexene-1,1-dimethanol and 2 parts of potassium hydroxide are agitated at 140–150° C. for 1 hour. The mixture is cooled to 100–110° C. and 8 parts of 1-amino-2-phenoxy-4-hydroxy-anthraquinone are added. The mixture is then heated at 140–150° C. for three hours under nitrogen, cooled to 80° C. and diluted in 1000 parts of water. A red product is precipitated as well as the excess cyclohexene-dimethanol. The solid is filtered off, washed with hot water until the cyclohexene-dimethanol is completely eliminated, and dried. 8.2 parts of 1-amino-4-hydroxy - 2 - (1-hydroxymethyl - 3 - cyclohexene-1-yl)methoxy-anthraquinone in the form of a red powder are thus obtained.

0.5 part of this powder and 1 part of dinaphthylmethane-disulphonate or sodium are ground in 6 parts of water until a fine dispersion is obtained. This mixture is poured into 3000 parts of water and 1.5 parts of 2-hydroxy-diphenyl are added. The dyebath thus prepared is heated to 60° C. and 100 parts of polyester fibres are introduced. The bath is heated to boiling in a period of 20 minutes and maintained at this for an hour. The fibres are removed from the bath, rinsed in water and dried. They are dyed a pink shade which is very fast to light and remarkably resistant to heat-fixing and creasing.

EXAMPLE 2

50 parts of 3-cyclohexene-1,1-dimethanol and 2.3 parts of potassium hydroxide are agitated at 90–100° C. for 1 hour, then 3.4 parts of 1-amino-4-hydroxy-anthraquinone-2-sulphonate of sodium are added. The mixture is heated at 130–140° C. under nitrogen for 5 hours and is then poured into 500 parts of water. The solid is filtered off and washed with hot water to remove the diol. 3 parts of a red powder are thus obtained which melts at 169–171° C. after crystallisation from chloroform.

In a dispersed state, this dyestuffs dyes fibres based on polyester a pink shade identical with that obtained in Example 1, and also fast to light, heat-fixing and creasing.

Example 3

10 parts of potassium hydroxide are dissolved in 100 parts of 3-cyclohexene-1,1-dimethanol at 90–100° C. 15 parts of 1-amino-4-(4-methylphenylsulphonylamino)-anthraquinone-2-sodium sulphonate are added to this solution in a period of 15 minutes. The temperature is maintained at 80–90° C. until the sulphonated derivative disappears. The product is then diluted with water, the precipitate filtered off, washed with hot water and dried. The 1-amino - 4 - (methylphenylsulphonylamino)-2-(1-hydroxymethyl-3-cyclohexene-1-yl)methoxy - anthraquinone thus obtained dyes fibres based on polyesters in a full-bodied red shade having very good fastness especially to sublimation.

I claim:

1. Dyestuffs of the formula:

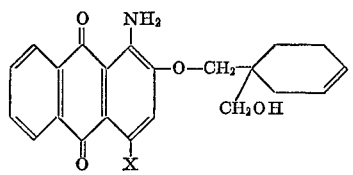

in which X is hydroxy, amino or p-tolylsulfonylamino.

2. The compound of the formula:

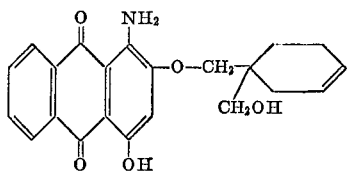

3. The compound of the formula:

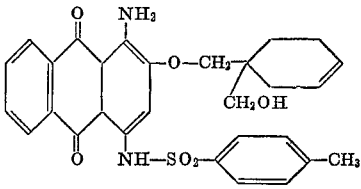

References Cited
UNITED STATES PATENTS

| | | | |
|---|---|---|---|
| 3,538,129 | 11/1970 | Sato et al. | 260—376 |
| 2,992,240 | 7/1961 | Lodge | 260—380 |
| 2,773,071 | 12/1956 | Pizzarello | 260—380 |

FOREIGN PATENTS

| | | | |
|---|---|---|---|
| 756,261 | 9/1956 | Great Britain | 260—380 |

LORRAINE A. WEINBERGER, Primary Examiner

R. GERSTL, Assistant Examiner

U.S. Cl. X.R.

8—39, 40; 260—380